Figure 1:
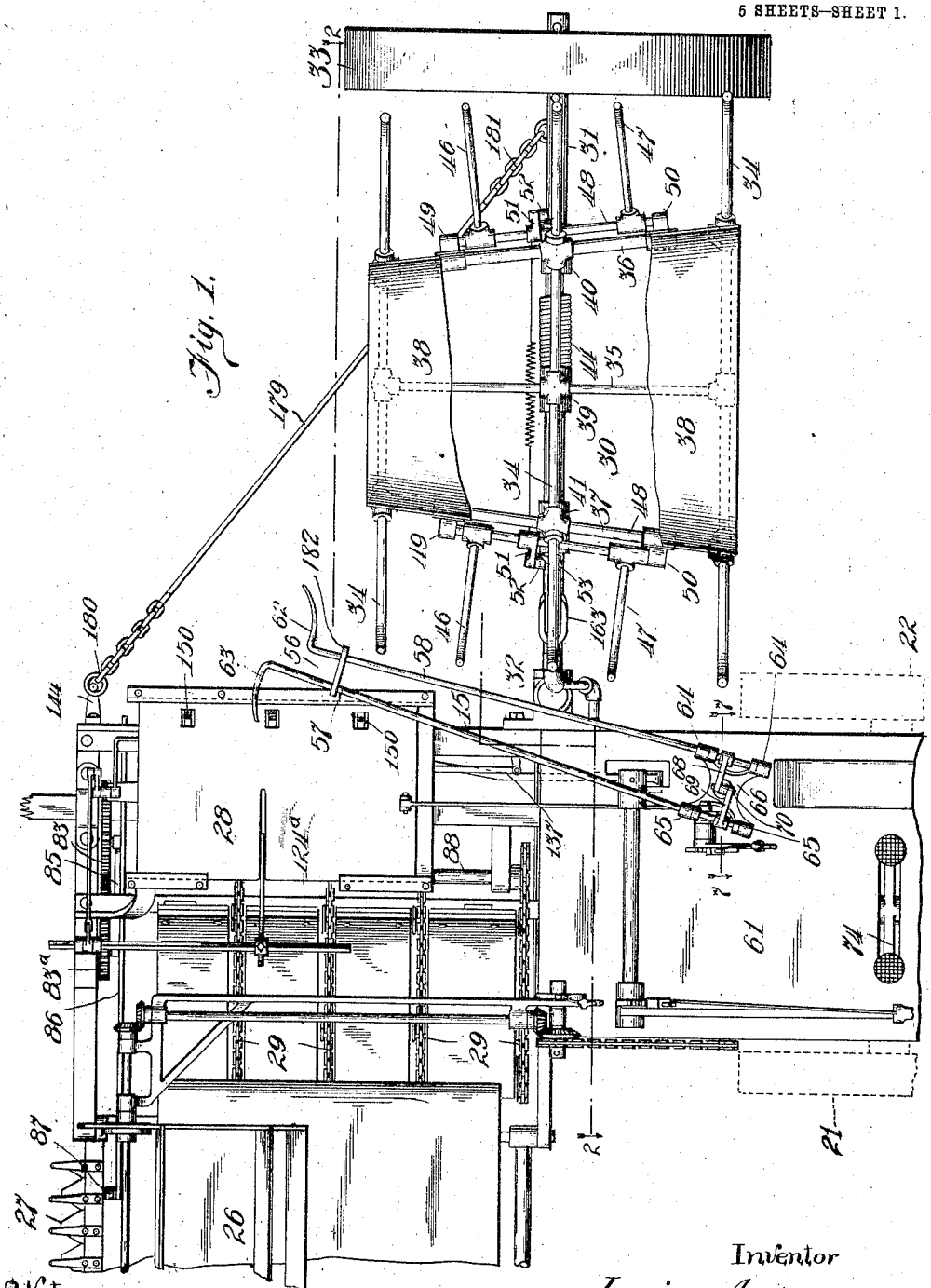

L. ANDERSON.
SHOCK FORMER FOR GRAIN BINDERS.
APPLICATION FILED OCT. 1, 1908.

989,940.

Patented Apr. 18, 1911.
5 SHEETS—SHEET 1.

Witnesses

Inventor
Louis Anderson
Gillson & Gillson
Attorneys

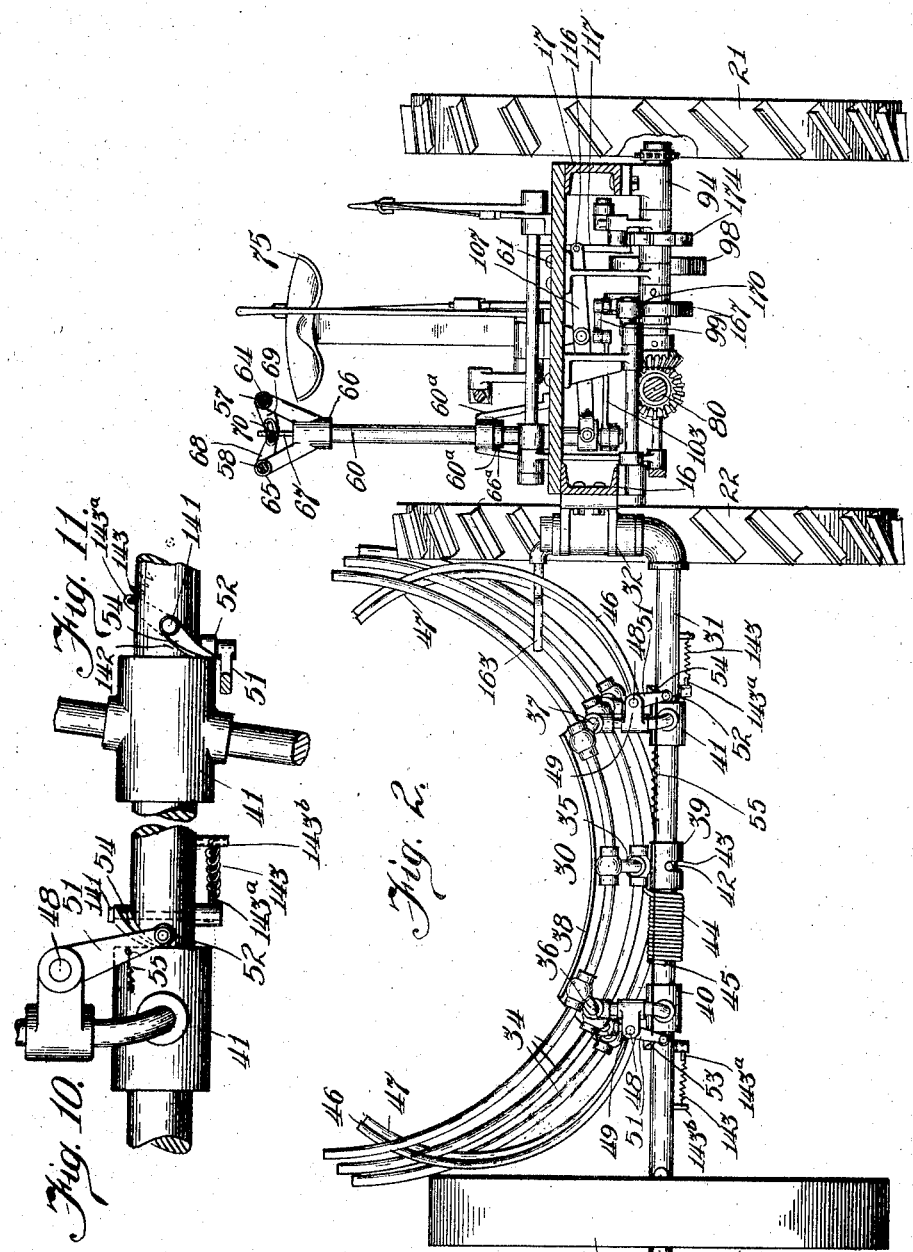

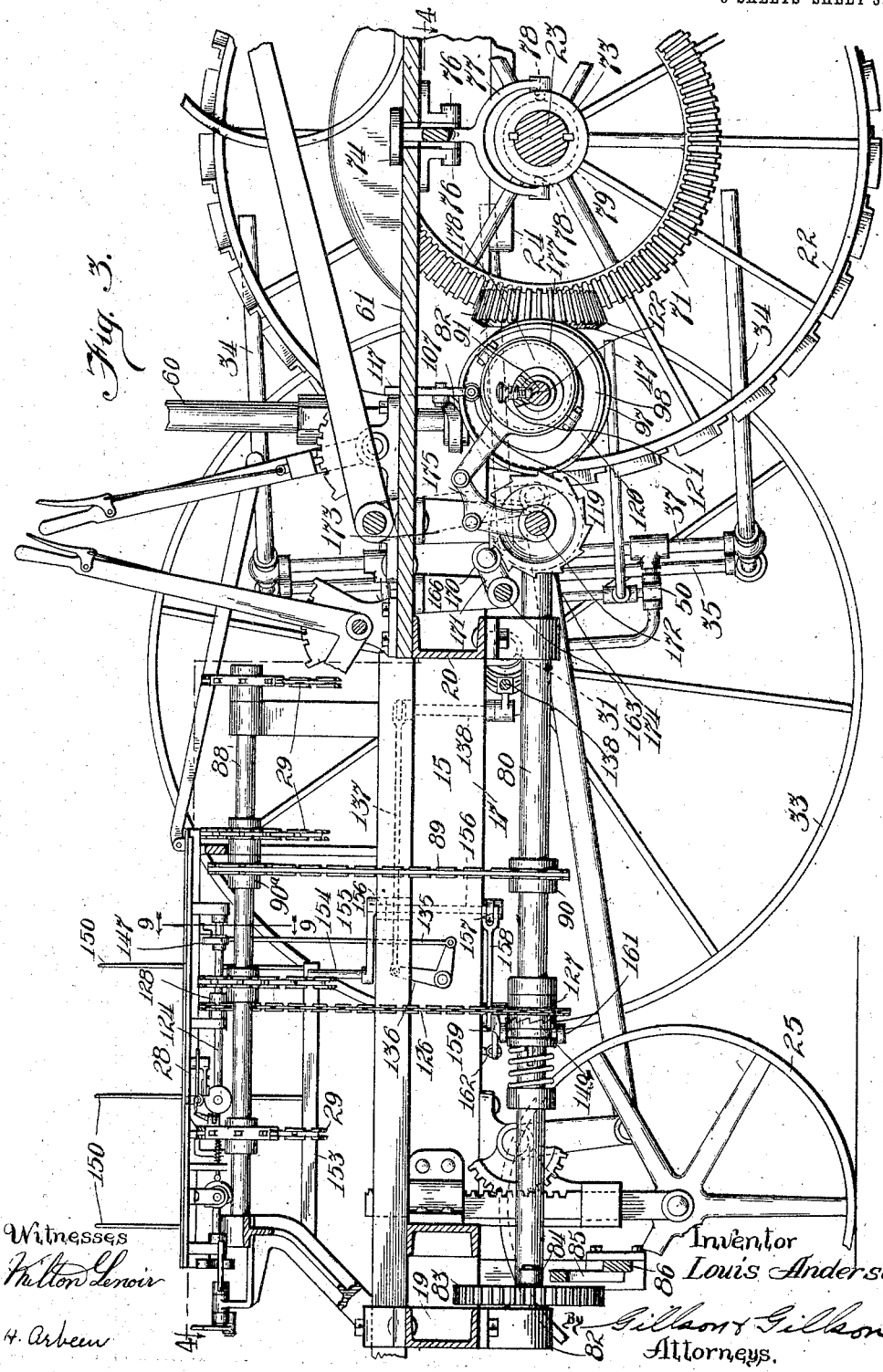

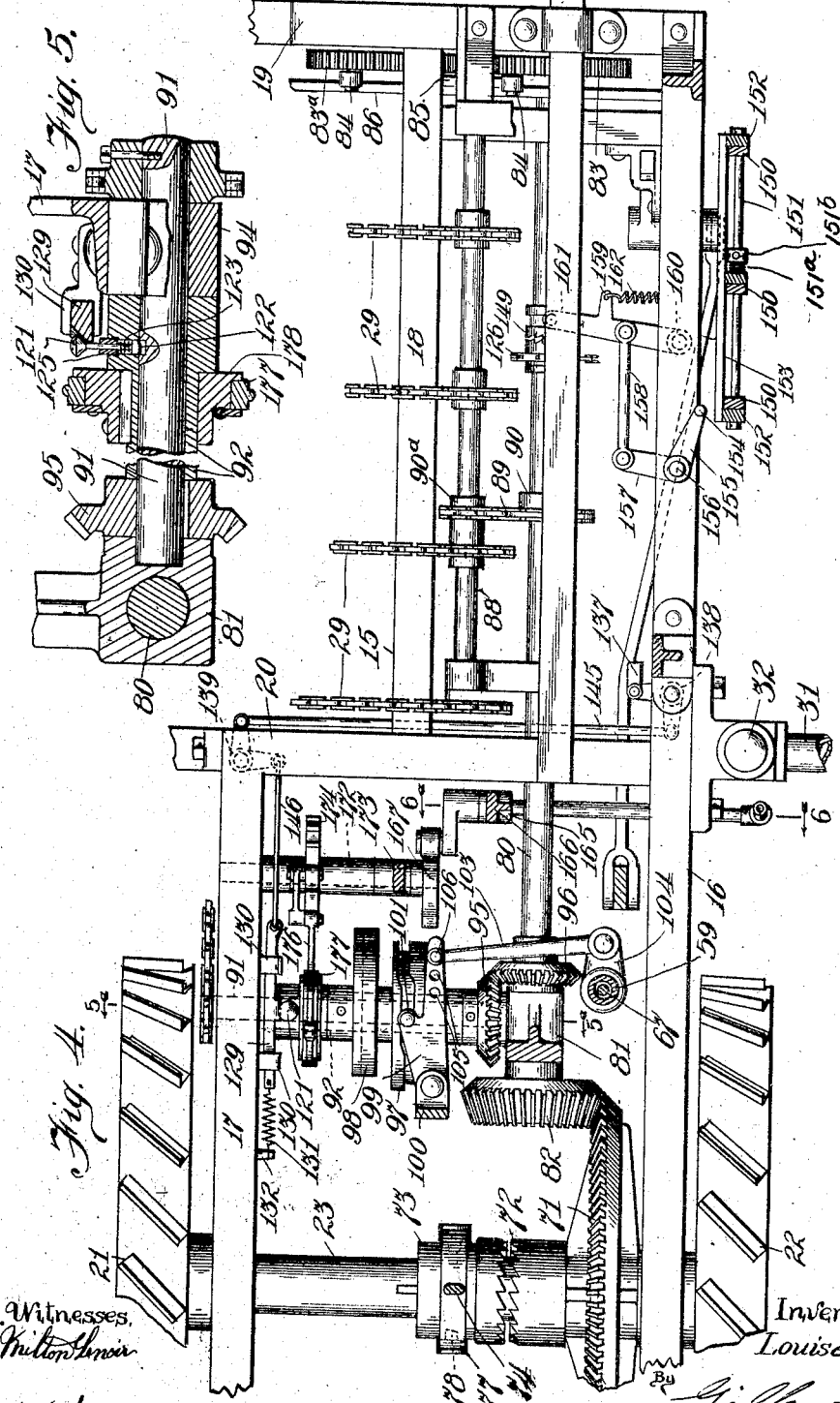

L. ANDERSON.
SHOCK FORMER FOR GRAIN BINDERS.
APPLICATION FILED OCT. 1, 1908.
989,940.
Patented Apr. 18, 1911.
5 SHEETS—SHEET 5.
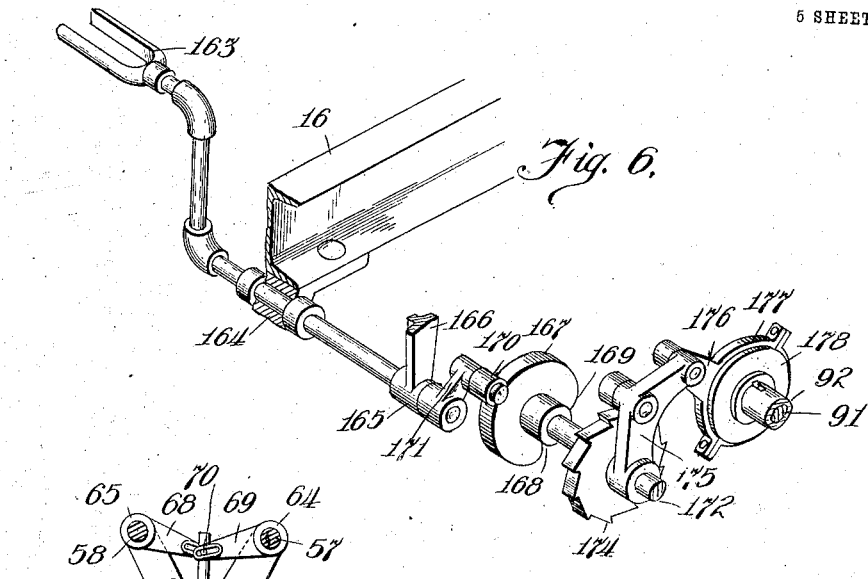
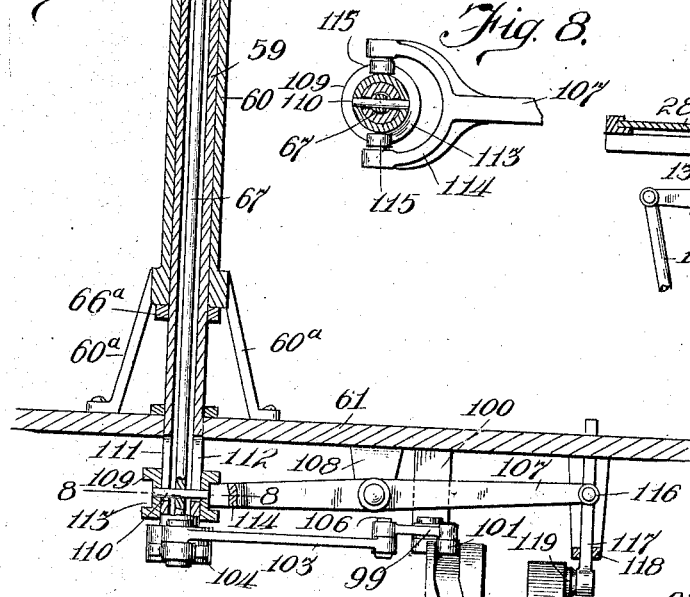
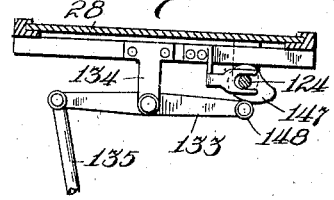
Witnesses
Milton Lenoir
H. Curreen
Inventor
Louis Anderson.
By Gillson & Gillson
Attorneys

UNITED STATES PATENT OFFICE.

LOUIS ANDERSON, OF CHICAGO, ILLINOIS.

SHOCK-FORMER FOR GRAIN-BINDERS.

989,940.

Specification of Letters Patent.   Patented Apr. 18, 1911.

Application filed October 1, 1908. Serial No. 455,654.

*To all whom it may concern:*

Be it known that I, LOUIS ANDERSON, a citizen of the United States, and resident of Chicago, county of Cook, and State of Illinois, have invented certain new and useful Improvements in Shock-Formers for Grain-Binders, of which the following is a specification, and which are illustrated in the accompanying drawings, forming a part thereof.

The invention relates to harvesting machines, and more particularly to those designed for cutting grain and tying it into bundles wherein provision is made for depositing the bundles thus produced upon the ground in an upright position in the form of a shock.

In machines for reaping grain and tying it into bundles, as usually constructed, the grain is received by the binding mechanism so turned that the heads of the grain are directed toward the rear of the machine, while in order that the bundles of grain may be deposited upon the ground in an upright position as the machine moves forward it is essential that the bundles be so turned that the butts of the grain comprised therein be rearwardly directed.

The invention contemplates, therefore, a grain binder including a rearwardly-tilting cradle for receiving the bundles of grain and for depositing them upon the ground when a predetermined number has accumulated therein, and means for delivering the bundles, one at a time, from the binding mechanism of the machine to the cradle, adapted to turn the individual bundles end for end in transit.

The object of the invention is to simplify and improve the construction and operation of machines of the kind described.

In the accompanying drawings, Figure 1 is a plan view of a harvesting machine embodying the features of the invention; Fig. 2 is a transverse vertical sectional view of the same, taken on the broken line 2—2 of Fig. 1; Fig. 3 is a central longitudinal vertical sectional view of the same, but shows the shock former in the discharging position; Fig. 4 is a plan sectional view taken on the line 4—4 of Fig. 3; Fig. 5 is a detail sectional view taken on the line 5—5 of Fig. 4; Fig. 6 is a detail perspective view, partly in section, the plane of the section being indicated by the line 6—6 on Fig. 4; Fig. 7 is a detail sectional view taken on the line 7—7 of Fig. 1; Fig. 8 shows in section a detail of the mechanism as viewed from the line 8—8 on Fig. 7; Fig. 9 is a sectional detail view taken on the line 9—9 of Fig. 3; and Figs. 10 and 11 are a detail side elevation and plan sectional view, respectively, illustrating a cam movement shown in Fig. 2, drawn to a larger scale.

The main carrying frame of the machine is designated generally by the numeral 15, and is most clearly shown in Fig. 4 of the drawings. It is preferably substantially rectangular in shape, being, as shown, of greater width at the rear than at its forward end, and comprises the longitudinal side rails 16, 17, 18, and the forward and intermediate cross rails 19, 20. This frame is supported adjacent its rear end by a pair of traction wheels 21, 22, which, as shown, are secured to an axle 23 extending transversely beneath the frame and journaled in brackets, as 24, secured to the side rails 16, 17. At its forward end the frame 15 is supported by a vertically adjustable caster wheel 25. The axle 23 is rotated by the traction wheels 21, 22, as the machine is drawn over the ground, and serves for driving the operative parts of the machine.

The usual reaping platform 26, having at its forward edge a reciprocating cutter blade 27, is provided, and is supported at one side of the frame 15.

Binding mechanism, generally designated 28, is mounted upon the frame 15 adjacent its forward end, grain being delivered to the binding mechanism from the reaping platform 26 by an elevating apron comprising a plurality of sprocket chains 29. This binder mechanism may be of any desired form convenient for tying grain into bundles with twine. As shown it comprises knotting mechanism including a rotating shaft 124, adapted to make one revolution for each knot produced, and a movable twine-carrying arm 124ª.

A cradle, generally designated 30, for receiving the bundles of grain from the binding mechanism 28 and depositing them upon the ground in the form of a shock, is mounted at the other side of the frame 15 from the reaping platform 26. As shown, the cradle 30 is carried by an arm 31, extending laterally from the frame 15. The arm 31 is preferably pivotally secured to the frame 15 at 32 (Fig. 1) to swing in a horizontal plane, and as shown the outer end of the arm is supported by a carrying wheel 33, rotatably mounted upon the arm. If desired, as when cutting the first swath of grain about the edge of a field bounded by a fence, the cradle 30 may be moved to an inoperative position by swinging the arm 31 forward toward the side of the frame 15, a hooked bracket 144 being provided for receiving and supporting the outer end of the arm when in this position. When the cradle 30 is in use, backward movement of the arm 31 is limited by a brace rod 179, extending from the forward part of the frame 15 to the outer end of the arm, sections, as 180, 181, of the brace rod 179 being flexible, as by being formed of chain, to permit the arm 31 to yield forwardly. The cradle 30, in shape, preferably takes the form of a tapered trough having open ends, and being longitudinally disposed with respect to the direction of movement of the machine, the larger end of the trough being at the rear. As shown, the cradle comprises a plurality of curved ribs 34, united intermediate their ends by longitudinally inclined stays 35, 36, 37, one of such stays, as 35, being preferably located upon the median line of the cradle and the other stays, as 36, 37, being located upon either side of the stay 35 adjacent the foot of the trough. A smooth floor for the cradle may be provided by covering the ribs 34 and stays 35, 36, 37, with a curved plate 38.

The body of the cradle just described is mounted upon the arm 31 to swing in a vertical plane by means of brackets 39, 40, 41, rigidly secured to the stays 35, 36, 37, respectively, and rotatably receiving the arm 31. To limit the swinging of the cradle, a pin 42 (Fig. 2), fixed in the arm 31, traverses a slot 43 in one of the brackets, as 39. A spring 44, coiled about the arm 31, is secured at one end, as at 45, in the arm 31 and bears upon the bracket 39 at the other end to yieldingly maintain the cradle 30, when empty, in a substantially horizontal position against the stop 42.

Means are provided for compressing the bundles of grain contained in the cradle 30 and for retaining them in position in the cradle as it swings downwardly about the arm 31 from the horizontal position illustrated by full lines in Fig. 2 of the drawings, and for releasing the compressed bundles when the cradle reaches the discharging position illustrated by dotted lines in Fig. 3. As shown, a pair of curved arms 46, 47, are mounted at each side of the cradle to swing over the contents of the cradle. The arms 46, 47, of each pair are secured to a shaft 48, rotatably mounted in bearing blocks, as 49, 49, and 50, 50, secured to the brackets 40, 41, provided for supporting the cradle. For controlling the swinging of the arms 46, 47, a crank-arm 51 (Figs. 10 and 11), having at its outer end a cam-engaging roller 52, is mounted upon each of the shafts 48.

Movable cam fingers 53, 54, are pivotally mounted upon the arms 31, as at 141, for engaging the cam rollers 52 to swing the arms 46, 47, over the contents of the cradle 30 as it turns about the arm 31 to the discharging position. A spring 55 reacts between the crank-arms 51 for yieldingly maintaining the arms 46, 47, in the open position illustrated by full lines in Figs. 1 and 2 of the drawings. As shown, each of the cam fingers 53, 54, is tapered, and they act upon the cam rollers 52 during the turning of the cradle 30 about the arm 31 in one direction only. When the cradle has turned to the discharging position the cam rollers 52 pass the ends of the cam fingers 53, 54, and the arms 46, 47, are opened by the spring 55 reacting between the crank-arms 51. During the return movement of the cradle to the horizontal receiving position, the rollers 52 traverse the spaces 142 behind the cam fingers 53, 54, the fingers being turned about the pivots 141, against the effort of springs 143, secured at one end to crank-arms 143ª carried by the pivots 141, and at the other to studs 143ᵇ mounted on the arm 31, to permit the cam rollers to pass. Preferably the shafts 48 carrying the arms 46, 47, are inclined to the axis of the cradle 30, whereby the bundles of grain contained therein are more firmly compressed by the arms 46, 46, mounted on the shafts adjacent one end than by the arms 47, 47, thus forming the bundles into a shock of tapered form having a broad base before depositing them upon the ground.

For transferring the bundles of grain from the binder mechanism 28 to the cradle 30, and for turning the bundles end to end in transit, a fork 56, comprising a pair of rotatable fingers 57, 58, is provided. This fork is mounted to swing in a substantially horizontal plane at the top of a post 59, having a bifurcated head 66, each arm of the head being further divided to provide bearings, as 64, 65, for each of the fingers of the fork.

For supporting the post 59 and other operative parts, the machine is provided with a deck 61 covering the frame 15. An upright sleeve 60, having standards 60ª at its foot, secured to the deck 61, provides a bearing for the post 59. As most clearly shown in Figs. 2 and 7 of the drawings, the post 59 extends downwardly between the standards 60ª through the deck, and is held against vertical movement in the sleeve 60, by the bifurcated head 66 and by a collar 66ª carried by the post at opposite ends of the sleeve.

The fingers 57, 58, of the fork 56 are of unequal length, and each has an overturned outer end 62, 63, these overturned outer ends of the fingers being curved for grasping a bundle of grain which, in being gripped by the fork, is turned horizontally through an angle of about 90 degrees because of the unequal length of the fingers, thus effecting a partial end to end turning of the bundle. For rotating the fingers 57, 58, in the bearings 64, 65, to cause the overturned outer ends of the fingers to grasp or release a bundle of grain, a vertically-reciprocable rod 67 (Fig. 7), which extends downwardly through the post 59, is preferably provided. This rod is operatively connected with each of the fingers 57, 58, by means of crank-arms 68, 69, mounted on the fingers between the bearings 64, 65, and having a pin and slot engagement 70 with the slot.

For communicating power from the rotating axle 23 of the machine to the cutter blade 27, the binder mechanism 28, the fork 56, and to mechanism for controlling the swinging of the cradle 30 upon the arm 31, a driving gear 71, located upon the axle 23 between the side members 16, 17, of the frame 15, is provided. This gear is preferably loosely mounted upon the axle 23, but is adapted to be rotated by the axle, when desired, and when the machine is driven in a forward direction, as shown, by means of a clutch member 73, having inclined clutch teeth 72, which is splined to the axle and is movable into and out of engagement with a complementary formed face of the hub of the gear 71. Any means conveniently accessible by the attendant may be employed for manually shifting the clutch member 73. For this purpose I have shown a treadle 74 (Figs. 1 and 3), which extends upwardly through the deck 61 adjacent the driver's seat 75. This treadle is pivotally mounted in a bracket 76, secured to the under side of the deck 61, and has at its lower end a yoke 77, which straddles the hub of the clutch member 73 and has inturned studs 78 which enter a circumferential channel 79 formed therein. A countershaft 80, journaled in brackets, as 81 (Fig. 4), secured to the under side of the deck 61 and carrying at one end a gear 82, which meshes with the driving gear 71 mounted on the rotating axle 23, extends longitudinally of the machine preferably to the forward end of the frame 15. This countershaft has driving connection with the several operative parts of the machine.

For driving the cutter blade 27 of the reaping platform 26, a spur gear 83 (Fig. 1) is mounted on the countershaft 80 adjacent its forward end. This gear meshes with a second gear 83ª, preferably of the same size as the gear 83, and both of these gears carry roller studs 84, adapted to contact alternately and from opposite sides with a member 85 carried by a slide bar 86, which is connected to the cutter blade 27 at 87.

For driving the sprocket chains 29 of the elevating apron provided for delivering grain from the reaping platform 26 to the binder mechanism 28, a sprocket chain 89 is provided which turns over sprocket wheels 90 and 90ª, mounted, respectively, on the countershaft 80, and a second shaft 88 carrying sprockets over which turn the chains 29. A sprocket chain 126, turning over a sprocket wheel 127, loosely mounted on the countershaft 80 and adapted to be automatically connected thereto by clutch mechanism 149, is provided for driving the binder mechanism 28. This sprocket chain turns over a sprocket wheel 128, fixed in position on a shaft 124 of the binder mechanism.

The clutch mechanism 149 is adapted to be automatically operated to cause the shaft 124 of the binder mechanism 28 to be intermittently driven from the countershaft 80 when a sufficient amount of grain has been delivered to the binder mechanism to form a bundle. To this end the binder mechanism comprises a plurality of trip fingers 150, against which the accumulating grain delivered by the apron comprising the sprocket chains 29 bears. These fingers are carried by a rock shaft 151, journaled in brackets 152, formed upon the frame of the binder mechanism, all of the fingers being continued below the rock shaft, as most clearly shown in Fig. 3 of the drawings, and connected by a tappet bar 153. As shown, a spring 151ª is coiled about the rock shaft 151 and reacts between a collar 151ᵇ on the rock shaft and one of the bracket members 152 to cause a frictional engagement between the fingers 150 and the bracket members 152, to resist the swinging of the fingers. The tappet bar 153 is adapted to be moved by pressure of the grain against the fingers 150, into contact with a stud 154, mounted upon the outer end of a crank-arm 155, carried by a vertically-disposed rock shaft 156. At the lower end of the rock shaft 156 a second crank-arm 157 is provided, and this crank-arm is connected by a link 158 to a shipper arm 159, pivotally secured to the frame member of the machine at 160, and having at its free end a yoke 161, which operatively engages the movable member of the clutch 149. A spring 162 reacts between the shipper member 159 and the frame of the machine to normally maintain the movable member of the clutch 149 out of engagement with the sprocket wheel 127.

For rotating the post 59 to swing the fork 56 and for turning the fingers 57, 58, of the fork, a continuously rotating shaft 91, operatively connected to the countershaft 80 by means of bevel gears 95, 96, mounted on the shaft 91 and the countershaft 80, respectively, is provided. The shaft 91 turns within a tubular shaft 92, and is carried by brackets 81, 94, one of which, as 81, is secured to the under side of the deck 61 and forms a bearing for the countershaft 80. The other bracket 94, is secured to the side rail 17 of the frame 15. Cams 97 and 98 (Figs. 4 and 7) for turning the post 59 and for rotating the fingers 57, 58, of the fork 56, respectively, are mounted on the tubular shaft 92.

The operative connection between the cam 97 and the post 59 comprises a horizontally-swinging bell-crank lever 99, pivotally mounted upon a bracket 100, secured to the under side of the deck 61, and carrying at the end of one of its arms a cam-engaging roller 101, which traverses the circumferential cam groove 102 of the cam 97. The other arm of the bell-crank lever 99 is connected by a link 103 to a crank-arm 104, provided at the foot of the post 59, the link and crank-arm being united by a bolt 106. In order that the angle through which the post 59 turns may be suitably adjusted, that arm of the bell-crank lever 99 to which the link 103 is connected is provided with a plurality of apertures 105, into any one of which the bolt 106, employed for connecting the link 103 to the lever, may be inserted.

A vertically-swinging lever 107, having a pivotal support upon a bracket 108, secured to the under side of the deck 61, is provided for communicating motion from the cam 98 to the rod 67, which slides within the post 59 for turning the fingers 57, 58, of the fork 56. The connection between the lever 107 and the rod 67 is adapted to permit the rod to turn with the post 59, and is most clearly shown in Fig. 8 of the drawings. This connection comprises a collar 109, which loosely surrounds the post 59 adjacent its lower end, and which is secured to the rod 67 by means of a pin 110, extending through vertical slots 111, 112, formed in the wall of the post 59. The collar 109 has a circumferential groove 113, and the end of the lever 107 is forked, as indicated at 114, each arm of the fork being provided with an inwardly-directed stud 115, which enters the groove 113. The other end of the lever 107 is operatively connected at 116 to a rod 117, having a vertically sliding movement in a bracket 118, carried by the deck 61 and having at its lower end a cam-engaging roller 119, which runs in a cam track 120 formed upon the face of the cam 98.

Clutch mechanism is provided for rotatably connecting the tubular shaft 92 with the shaft 91 housed therein, when it is required that a bundle of grain shall be transferred from the binder mechanism 28 to the shock-forming cradle 30. This clutch mechanism is adapted to be automatically operated whenever the binder mechanism 28 has completed the tying of a bundle of grain. As shown it comprises a pin 121, carried by the tubular shaft 92 and adapted to enter an aperture 122 provided in the shaft 91 for rotatably connecting the shafts. A spring 123, coiled about the stem of the pin and reacting between the enlarged inner end of the pin and an apertured plug 125 fixed in the tubular shaft 92 and surrounding the pin, is provided for advancing the pin, and a cam slide 129, engageable with the head of the pin is provided for raising the pin out of engagement with the shaft 91 against the effort of the spring 123. The cam slide 129 is mounted in brackets 130, carried by the side rail 17 of the frame of the machine, and is normally held by a spring 131, reacting between the end of the cam slide and a stud 132 carried by the side rail 17, in that position in which the pin 121 is raised by it. When it is required that the tubular shaft 92 should rotate for operating the fork 56, the cam slide 129 is momentarily withdrawn from beneath the head of the pin 121 against the effort of the spring 131, thus permitting the shaft 92 to make one complete revolution, its movement being then arrested by the raising of the pin 121 by contact between the head of the pin and the cam slide.

The mechanism for momentarily withdrawing the cam slide 129 from beneath the head of the pin 121 is most clearly shown in Figs. 3 and 9 of the drawings. It comprises a vertically-swinging trip lever 133, pivotally mounted upon a bracket 134 carried by the frame of the binder mechanism 28, and operatively connected to the cam slide 129 by means of a series of links and bell-crank levers 135, 136, 137, 138, 145, 139 and 146. The trip lever 133 is operated when the binder mechanism 28 has completed the tying of a bundle of grain, by means of a cam 147, mounted on the driving shaft 124 of the binder mechanism, and operatively engaging a cam roller 148, carried by the trip lever 133.

Means releasable when a predetermined number of bundles of grain have been deposited in the cradle 30, are provided for maintaining the cradle 30 in a horizontal position. Preferably mechanical means are also provided for assisting the spring 44 in returning the cradle to the horizontal position when its load has been discharged. The tilting of the cradle from the horizontal receiving position illustrated in Figs. 1 and 2 of the drawings, to the discharging position illustrated in Fig. 3 of the drawings, is effected by gravity, the weight of a sufficient number of bundles of grain to form a shock being relied upon to turn the cradle against the effort of the spring 44, and for swinging the arms 46, 47, over the cradle to compress the bundles into the form of a shock.

The means provided for releasably maintaining the cradle 30 in the horizontal position and for returning the cradle to this position after its load has been discharged, is illustrated in detail in Fig. 6 of the drawings. It comprises a forked crank shaft 163, engageable with one of the ribs 34 of the frame of the cradle, as shown in Fig. 1. This crank shaft is journaled at 164 in one of the side rails, as 16, of the frame 15 of the machine, and at 165 in a bracket or hanger 166.

A cam 167, adapted to be turned through a part of a revolution each time a bundle of grain is delivered by the fork 56 from the binder mechanism 28 to the cradle 30, is provided for releasing the crank-arm 163 to permit it to be turned in one direction by the tilting of the cradle 30, and for swinging the crank-arm to return the cradle to the horizontal position. This cam takes the form of a disk having a peripheral notch 168, one side of the notch being inclined, as shown at 169, and a roller 170, carried by a crank 171 mounted on the crank shaft 163, rides upon the periphery of the disk thus forming a lock for maintaining the cradle 30 in the horizontal position. When the disk 167 is turned to such a position that the notch 168 comes in front of the roller 170, the roller will enter the notch by reason of the tilting of the cradle 30, due to the weight of its load, and a further turning of the disk causes the inclined cam surface 169 to bear upon the roller and swing the crank shaft 163 to assist the spring 44 in returning the cradle to its receiving position. The cam disk 167 is carried by a shaft 172, journaled in brackets, as 173, secured to the under side of the deck 61, and carries a ratchet wheel 174 having ratchet teeth preferably numerically equal to the number of bundles which it is desired shall be accumulated in the cradle 30 for the formation of a shock. For turning the shaft 172 and cam disk 167, a pawl-arm 175, which swings upon the shaft, is provided. This pawl-arm is connected to an eccentric rod 176, the strap 177 of which incloses an eccentric 178 mounted upon the tubular shaft 92.

During the operation of the machine grain mowed by the reaping platform 26 is continuously delivered to the binder mechanism 28 by means of the elevating apron comprising the sprocket chains 29. When a sufficient quantity of grain has accumulated upon the binder mechanism to depress the fingers 150, the clutch 149 is operated by contact of the tappet bar 153, carried by the fingers 150, with the stud 154, to rotatably connect the sprocket wheel 127 with the counter-shaft 80, and cause the binder mechanism, comprising the shaft 124 and knotting mechanism including the twine-carrying arm 124ª, to be operated by the sprocket chain 126. When the shaft 124 has turned through a complete revolution, the cam 147 (Fig. 9) depresses the tappet lever 133, thus causing the cam slide 129 (Fig. 5) to be momentarily withdrawn from beneath the head of the pin 121 against the effort of the spring 131 (Fig. 4). The pin 121 is then advanced by the spring 123 (Fig. 5) to rotatably connect the tubular shaft 92 with the continuously rotating shaft 91, thus causing the fingers 57, 58 of the fork 56 to be rotated by a raising of the rod 67 (Fig. 7) by the cam 98 to grasp a bundle of grain between their overturned ends 62, 63.

By reason of the unequal length of the fingers 57, 58, the bundle of grain will be partially turned from end to end when grasped by the fingers. The fork 56 is then swung horizontally through an angle, whereby the turning of the bundle of grain from end to end is completed, and the bundle is brought to a position over the cradle 30 by a turning of the post 59, effected by the cam 97. A counter-rotation of the fingers 57, 58, of the fork 56, effected by the cam 98, then releases the bundle of grain from the fork, permitting it to fall into the cradle. A further movement of the cam 97 returns the fork 56 to a position adjacent the binder mechanism 28 for grasping the next bundle of grain formed therein.

When the tubular shaft 92 has made one complete revolution its movement is arrested by a raising of the pin 121, effected by the contact of the head of the pin with the cam slide 129, and during such revolution of the tubular shaft the shaft 172 and cam disk 167 (Fig. 6) are turned through a partial revolution by a swinging of the pawl arm 175 because of the turning of the eccentric 178 with the tubular shaft.

When a bundle of grain is removed from the binder mechanism 28 by the fork 56 and the fingers 150 thereby released, the operative parts of the binder mechanism, including the shaft 124, are brought to rest by a withdrawal of the movable member of the clutch 149 from contact with the clutch face of the sprocket 127 by means of the spring 162. As the cam disk 167 is turned through only a part of a revolution each time a bundle of grain is delivered to the cradle 30 by the fork 56, a plurality of bundles will be permitted to accumulate in the cradle before the notch 168, provided in the periphery of the cam disk, comes in front of the cam roller 170 to release the crank-shaft 163 and permit the cradle 30 to be tilted by the weight of its load to discharge the accumulated bundles in the form of a shock.

During the tilting of the cradle about the arm 31, the descending load contained therein will react upon the arm because of its tendency to fall in a straight line, and a yielding of the flexible portions 180, 181, of the brace-rod 172 will permit the arm to be swung forwardly thereby about its pivotal support 32. The cradle will thus be permitted to remain stationary for the settling of its load upon the ground until the brace rod 179 is again drawn taut by the forward movement of the machine.

The tapered form of the cradle 30, together with the inclined relation of the shafts 48 carrying the arms 46, 47, for compressing the bundles of grain as the cradle swings down, cause the bundle of grain to be deposited upon the ground in the form of a shock having a broad base and therefore having the necessary stability to remain standing without requiring the several bundles to be tied together with twine, or otherwise secured to each other.

Preferably the arms 57, 58, of the fork 56 are inclined toward each other, as shown in Fig. 1, and they are united near their free ends, as by a strap 182. As shown, the free end of this fork when at rest occupies a position somewhat to the right of the binder mechanism 28, as viewed in Fig. 1 of the drawings, and in operation is moved first to the left by the cam 97 to engage a bundle of grain, and then to the right to discharge the bundle of grain in the cradle 30.

I claim as my invention—

1. In combination, a harvesting machine having a carrying frame, a horizontally-swinging arm projecting laterally from the frame, a tilting cradle carried by the arm and movable about it between a substantially horizontal load-receiving position over the arm and a substantially vertical load-discharging position in rear of the arm, means for controlling the tilting of the cradle, and means for limiting the backward movement of the arm, the said arm being free to swing forwardly during the tilting of the cradle.

2. In combination, a harvesting machine having a carrying frame, a horizontally-swinging arm projecting laterally from the frame, a carrying wheel for the free end of the arm, a tilting cradle carried by the arm and movable about it between a substantially horizontal load-receiving position over the arm and a substantially vertical load-discharging position in the rear of the arm, means for controlling the tilting of the cradle, and means for limiting the backward movement of the arm, the said arm being free to swing forwardly during the tilting of the cradle.

3. In a shock former, in combination, a gravity-tilted cradle having an open end, and means for compressing the contents of the cradle operated by the tilting.

4. In a shock former, in combination, a gravity-tilted cradle having an open end, a pivotal support therefor, a pressure arm movable over the contents of the cradle, and a cam carried by the support engageable with the arm during the tilting of the cradle.

5. In a shock former, in combination, a backwardly tilting cradle, a pair of oppositely-inclined shafts journaled in the side walls of the cradle, the ends of the shafts remote from the rear end of the cradle being separated a less distance than the ends of the shafts adjacent the rear end of the cradle, pressure arms mounted on the shafts movable over the contents of the cradle upon rotation of the shafts, and means for rotating the shafts during the tilting of the cradle.

6. In a shock former, in combination, a backwardly discharging gravity-tilted cradle, a pivotal support therefor, a pair of oppositely-inclined shafts journaled in the side walls of the cradle, the ends of the shafts remote from the rear end of the cradle being separated a less distance than the ends of the shafts adjacent the rear end of the cradle, pressure arms mounted on the shafts movable over the contents of the cradle upon rotation of the shafts, cams mounted upon the cradle support, and crank-arms carried by the shafts engageable with the cams during the tilting of the cradle.

7. In a shock former, in combination, a pivotally-supported gravity-tilted cradle having an open end, a spring-returned pressure arm movable over the contents of the cradle, and a cam carried by the cradle support engageable with the arm during the tilting of the cradle.

8. In a harvesting machine, in combination, reaping mechanism, binder mechanism receiving from the reaping mechanism and including a shaft adapted to make one revolution for each bundle of grain produced thereby, a gravity-tilted shock-forming cradle receiving from the binder mechanism, means for controlling the tilting of the cradle including a cam shaft, a ratchet wheel on the cam shaft having ratchet teeth numerically equal to the number of bundles of grain required for a shock, a pawl arm coöperating with the ratchet wheel, clutch-controlled mechanism for swinging the pawl-arm, and a lever operated by the shaft of the binder mechanism for shifting the clutch.

9. In a harvesting machine, in combination, reaping mechanism, binder mechanism, a bundle transfer operable upon bundles produced by the binder mechanism comprising a rotatable tubular post, a pair of laterally directed grasping arms rotatably mounted upon the head of the post, cranks carried by the arms, and a rod housed within the post and connected to the arms, a cam shaft for turning the post and for shifting the rod of the bundle transfer, a clutch controlling the cam shaft, and a lever operated by the binder mechanism for shifting the clutch.

10. In a harvesting machine, in combination, reaping mechanism, intermittently operated binder mechanism, a bundle transfer operable upon bundles produced by the binder mechanism, a tilting shock-forming cradle receiving from the bundle transfer, means for controlling the tilting of the cradle, a ratchet wheel for driving such controlling means having ratchet teeth numerically equal to the number of bundles required for a shock, a pawl-arm coöperating with the ratchet wheel, a cam shaft operating the bundle transfer and the pawl-arm, a clutch controlling the cam shaft, and a lever operated by the binder mechanism for shifting the clutch.

11. In a harvesting machine adapted to be drawn over the ground, in combination, a backwardly-tilting shock-forming cradle turned by the weight of its load, and a support therefor adapted to yield forwardly during the tilting.

LOUIS ANDERSON.

Witnesses:
CHARLES B. GILSON,
LOUIS K. GILLSON.